Sept. 22, 1942.  T. N. HEMPHILL  2,296,667
STOP LIGHT CIRCUIT FOR AUTOMOBILES
Filed Aug. 4, 1940

Inventor
Thomas N. Hemphill

Patented Sept. 22, 1942

2,296,667

UNITED STATES PATENT OFFICE 2,296,667

STOP LIGHT CIRCUIT FOR AUTOMOBILES

Thomas Nelson Hemphill, Des Moines, Iowa

Application August 4, 1940, Serial No. 351,298

3 Claims. (Cl. 177—337)

The object of my invention is to provide a stop light circuit for automobiles of the type in which the stop light is illuminated by a closing of the circuit by means of the brake pedal of an automobile, and to provide in connection with said circuit, improved means whereby the stop light may be illuminated in advance of the closing of the circuit by the brake pedal, to effect a prewarning signal to a car following that the car in advance may be slowed up or brake set.

A further object is to provide in connection with a circuit of the above described type, means whereby the prewarning signal may be differentiated from the brake signal by producing in the stop lamp interrupted current so as to produce a flickering effect which will result in a steady illumination at the time the brake pedal is actuated.

More specifically, it is the object of my invention to provide in a stop light circuit a vacuum controlled switch which is designed to be connected with the intake manifold of the engine in such a manner that at such times as when the throttle valve is suddenly closed and a vacuum surge is created in the manifold above the normal vacuum obtained therein at such times as the automobile is operated under an idling condition due to the fact that the engine is operating at a higher speed than when idling, wherein the signal lamp will be caused to produce a signal by closing the circuit to warn an approaching car that the car may stop, or turning movements may be accomplished.

A further object is to provide in a stop light circuit employing a vacuum-controlled switch for closing the circuit, a current flasher or interrupter wherein the signal will have a flashing effect to differentiate from the regular stop light circuit, and thereby provide means whereby a signal stop light may be utilized for the purpose of supplying a prewarning signal and later a permanent stop signal.

My invention consists in the construction, arrangement and combination of the various parts of the device, whereby the objects contemplated are attained, as hereinafter more fully set forth, pointed out in my claims, and illustrated in the accompanying drawing, in which:

Figure 2:
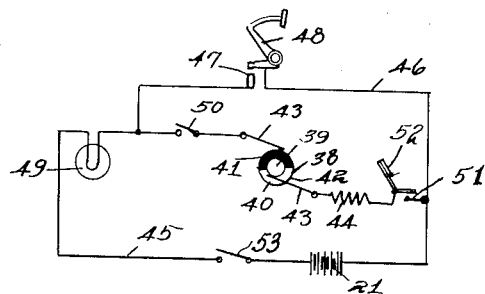
Figure 2 is a circuit diagram in a slightly modified form.
Figure 1:
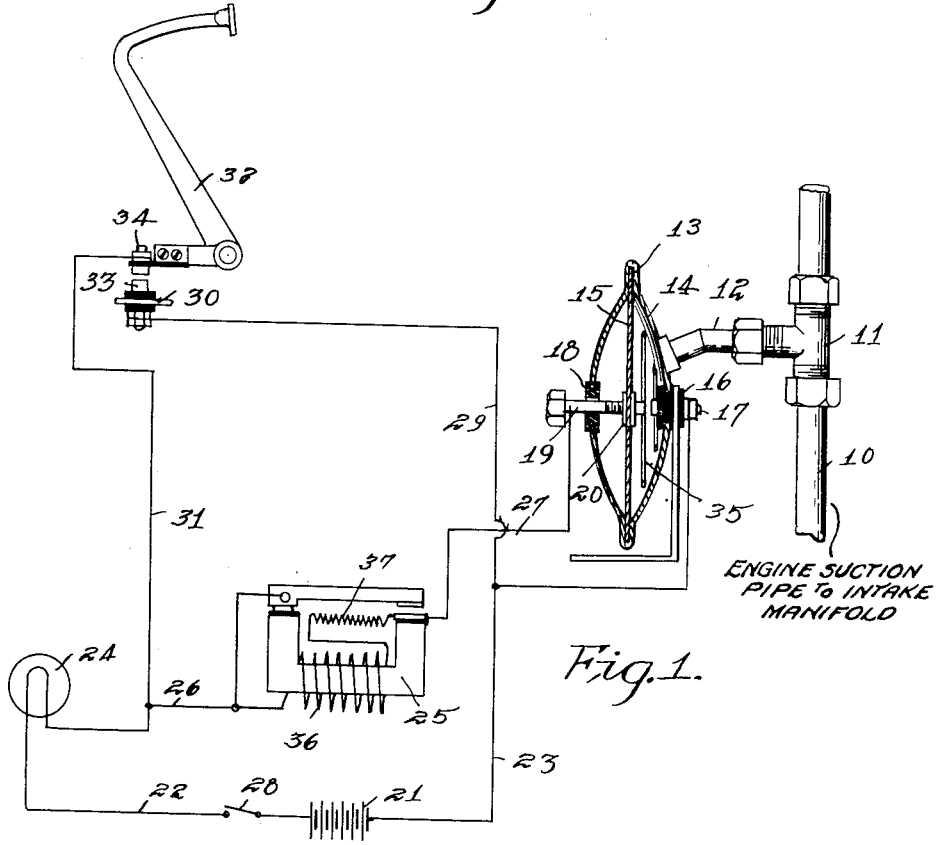
Figure 1 is a diagrammatical view of my improved signal circuit showing the vacuum switch in section and the manner in which the same is connected into the vacuum pipe leading to the intake manifold of an automobile engine.

I have used the reference numeral 10 to indicate a vacuum pipe which leads from the intake manifold of an automobile engine to the windshield wiper, in which is connected a T 11. Connected to the T 11 by means of a short pipe 12 I have provided a vacuum-controlled switch 13 comprising a casing 14 having a diaphragm 15 extending through said casing. One side of the casing 14 has an insulator 16 in which is mounted a contact member 17, the opposite side of the casing 14 having a bushing 18 formed of insulating material through which an adjusting pin 19 is mounted, the inner end of the pin 19 being mounted in a collar 20 supported in the central portion of the diaphragm 15, the inner end of the pin 19 serving as a second contact member adapted to engage the inner end of the member 17 when the diaphragm is moved inwardly, due to the difference between the air pressure on opposite sides of the diaphragm at such times as a partial vacuum is created in the pipe 10. The vacuum-controlled switch 13 is included in what I shall call a primary signal circuit, said circuit comprising a battery 21, conductors 22 and 23, a stop light 24, a flasher device 25, a conductor 26. Connecting the stop light 24 with the flasher is a conductor 27 connecting the flasher with the pin 19 of a switch 13, the conductor 23 being connected to the contact member 17. The conductor 22 also includes a hand-operated switch 28.

I have also provided a shunt circuit for the flasher 25, including a conductor 29, a switch device 30 and a conductor 31, the switch device 30 being designed to be closed by movement of a foot pedal 32 which is attached to the mechanism for operating the brakes of an automobile, the switch 30 including contact members 33 and 34.

The operation of my device is as follows: The switch device 13 is adapted to be connected preferably into the pipe 10 which leads from the intake manifold to the windshield wiper by means of a pipe 12. However, the pipe 12 may be connected directly to the intake manifold if so desired, the point of connection being preferably in that portion of the intake manifold between the throttle valve and the intake ports of the throttle valves in such a manner that as a partial vacuum is formed in the manifold the diaphragm will be moved outwardly against the action of a spring 35 and the primary electric circuit closed, causing the current to travel from the battery 21 to the conductor 23, the contact members 17 and 19, the conductor 27, to the winding 36 of the flasher 25, to the conductor 26, the stop light 24, and the conductor 22 and the battery 21. The flasher device 25 will then cause an interrupted or flickering light in the signal to be produced. The stem 19 is so adjusted that the contact members 19 and 17 will not be closed only by a vacuum surge of an amount greater than that contained in the intake manifold at such times as the engine is in an idling condition which is usually in the neighborhood of 17 or 18 inches of mercury. Under these conditions the stem 19 is so adjusted that the contacts will be closed when the vacuum has reached an amount of about 20 inches. This high vacuum takes place only at such times as the throttle valve is quite rapidly moved to a closed position, after the engine has been operated with a partial or full load, and is of short duration, so that at no time when the engine is operating under a normal idling condition are the contact members 17 and 18 closed.

Assuming that the car is in motion and that it is desired to set the brakes after the throttle has been closed, movement of the pedal 32 will close the contact members 33 and 34 and cause the circuit to be established through the conductors 29 and 31, thereby short-circuiting the flasher device 25 and causing a steady current to flow through the stop light 24. In this connection it should be borne in mind that the flasher 25 includes a resistance 37 which increases the resistance of the primary circuit over that of the shunt circuit, so that when the shunt circuit is closed, a comparatively small amount of current passes through the main circuit, the flasher and the coil 36, thus causing the flasher to cease to operate and a steady current to be delivered to the stop light 24, the shunting of the resistance 37 will tend to increase the voltage applied to the lamp 24, and in turn slightly increase the brilliancy of the said stop light due to a decrease in the resistance of the circuit.

By this arrangement it will be seen that if the car is operating at a comparatively high speed and the operator wishes to stop, he first closes the throttle valve which will cause the vacuum controlled switch to be closed and an interrupted current will be established in the stop lamp to produce a flickering effect, which will then be converted into a steady and direct light the moment that the brake pedal is operated to apply the brake, and thereby provide means wherein a signal stop light of ordinary construction, such as is commonly used in automobiles at the present time, may be utilized to form a stop light having first a prewarning signal producing an interrupted light, and then a direct or steady illumination of the light to indicate to the car following that the brakes would be applied and a stop likely to occur, and thereby provide means whereby the following car will have earlier warning and take precautionary measures to get his car under control in case the forward car should suddenly be stopped. This arrangement is particularly useful in connection with cars operated at comparatively high speed so that the operator in the following car may have more time to get his car under control than has heretofore been possible with the ordinary stop light system.

In Fig. 2 I have illustrated a slightly modified form of signal circuit wherein the automatic and electrically operated flasher device is eliminated and a mechanically operated current interrupter 38 substituted therefor, this interrupter being designed to be operated by any convenient means from power derived from the movement of some of the engine parts or from auxiliary power, the interrupter in simple form consisting of a shaft 39, a commutator block 40 having included an insulated portion 41 and a conduction portion 42 in conjunction with brushes 43. In a construction of this type the interrupter is usually of low resistance, and for that reason it is desirable that an additional resistance 44 be inserted in the primary circuit 45 so that current will be fed through the shunt circuit 46 at such times as the switch 47 is closed by the brake lever 48 and a steady current will be produced in the stop light 49. The main circuit also includes a switch 50 to provide means wherein the flasher circuit may be manually disconnected at such times as may be desired. A switch device 51 may be substituted for the vacuum controlled switch which is operated and closed by movement of the accelerator lever 52 to close the throttle valve. A suitable switch 53 is included in the circuit 45, thus providing means for manually opening and closing the primary circuit.

In the above construction it will be seen I have provided means wherein a prewarning signal may be given to an approaching car so that the operator may hold himself in readiness for a sudden stop on the part of the advancing car. The device is also provided with means wherein the closing of the primary circuit may be accomplished at different engine speeds and always at such times as when the vacuum surge is above the normal idling speed of the engine, thereby providing means whereby the prewarning signal may be given only at such times as when the cars are operating at high speed if so desired, thus providing means wherein a large percent of the rear end accidents may be avoided which result from sudden stopping of the advancing car without giving the following car sufficient warning.

I claim as my invention:

1. In a stop light signal system for motor-controlled vehicles, including means for controlling the power propelling said vehicles and means for applying the brakes for stopping the same, comprising a source of electricity, a main circuit and a shunt circuit, said main circuit including a stop light, an electric flasher embodying resistance and a normally opened vacuum-controlled switch adapted to be placed in operative communication with the intake manifold of an automobile engine and adjusted to close at the time the power is shut off, to establish electric current in said circuit by an amount of vacuum greater than that produced in said manifold at such times as the power is applied, a normally opened switch adapted to be controlled by the brake lever of an automobile, and closed as the brake lever is moved to operative position, whereby the flasher will be short-circuited and a continuous current delivered to said stop light to produce, first, a pre-warning flashing signal during the time interval between the time of the shutting off of the power propelling the automobile and the application of said brakes, and automatically thereafter a continuous stop light signal as long as the brake lever is depressed, even with the first said switch closed.

2. In a stop light signal system for motor-controlled vehicles, including means for controlling the power propelling said vehicles and means for applying the brakes for stopping the same, comprising a source of electricity, a main circuit and a shunt circuit, said main circuit including a resistance, a stop light, a circuit interrupter, a normally opened switch in said circuit adapted to be closed by a movement of the power controlling means to position to shut off the power applied to said vehicle to establish a current in said circuit, said shunt circuit including a stop light and a normally opened switch adapted to be controlled by the brake lever of said vehicle and closed as the brake lever is moved to operative position, whereby the current interrupter and resistance will be short-circuited and a continuous current delivered to said stop light to produce, first, a pre-warning flashing signal during the time interval between the time of the shutting off of the power propelling the vehicle and the application of said brakes, and automatically thereafter a continuous stop light signal as long as the brake lever is depressed, even with the first said switch closed.

3. A stop light system for automobiles, comprising an intake manifold, a source of electricity, a main circuit including a stop light, an electric flasher embodying resistance, and a normally opened vacuum controlled switch operatively connected to said intake manifold, a low resistance circuit shunting said flasher, including a brake lever controlled and normally opened switch, wherein the stop light may be first illuminated by the closing of the first switch to produce a flashing signal and wherein the flasher will be shunted out by the closing of the second switch, to produce a steady illumination of said signal light, even with the first switch closed.

THOMAS NELSON HEMPHILL.